(12) United States Patent
Krits et al.

(10) Patent No.: US 7,701,970 B2
(45) Date of Patent: Apr. 20, 2010

(54) PROTOCOL NEGOTIATION FOR A GROUP COMMUNICATION SYSTEM

(75) Inventors: Alexander Krits, Haifa (IL); James W. Stopyro, Rochester, MN (US); Roman Vitenberg, Oslo (NO); Alan J. Wecker, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 11/733,225

(22) Filed: Apr. 10, 2007

(65) Prior Publication Data

US 2008/0253391 A1 Oct. 16, 2008

(51) Int. Cl.
H04J 3/16 (2006.01)

(52) U.S. Cl. ............... 370/466; 370/467; 370/395.5; 709/231; 709/221

(58) Field of Classification Search .............. None
See application file for complete search history.

(56) References Cited

U.S. PATENT DOCUMENTS

| 6,836,473 | B1 | 12/2004 | Eriksson | |
| 6,912,230 | B1* | 6/2005 | Salkini et al. | 370/466 |
| 7,039,703 | B1* | 5/2006 | Clancy et al. | 709/225 |
| 7,158,525 | B2* | 1/2007 | Daffner et al. | 370/401 |
| 7,499,458 | B2* | 3/2009 | McDysan et al. | 370/396 |
| RE40,708 | E* | 5/2009 | Dondeti et al. | 713/163 |
| 2003/0224757 | A1* | 12/2003 | Dyck et al. | 455/411 |
| 2005/0132000 | A1* | 6/2005 | Richardson et al. | 709/204 |
| 2007/0189193 | A1* | 8/2007 | Previdi et al. | 370/256 |
| 2008/0069071 | A1* | 3/2008 | Tang | 370/342 |
| 2008/0075072 | A1* | 3/2008 | Cao | 370/389 |
| 2008/0109853 | A1* | 5/2008 | Einarsson et al. | 725/62 |
| 2008/0219227 | A1* | 9/2008 | Michaelis | 370/338 |

OTHER PUBLICATIONS

T. Enokido et al., "A group communication protocol for autonomic computing", Proceedings of the 2005 11th International Conference on Parallel and Distributed Systems, vol. 2, Jul. 20-22 2005 pp. 443-447 vol. 2.

H. Higaki, "Extended group communication algorithm for updating distributed programs", Proceedings, 1996 International Conference on Parallel and Distributed Systems (Cat. No. 96TB100045), 1996, 386-93.

\* cited by examiner

Primary Examiner—Huy D Vu
Assistant Examiner—Zewdu Beyen

(57) ABSTRACT

Methods and systems are provided in a group communication system for dynamically changing a version of a group communication protocol from a first version to a second version transparently to external sources and destinations. The system accommodates newly joining members that can only support versions of the protocol other than the version currently in use without interruption in service. Similarly, the system can upgrade its operating version of the group communication protocol to improve performance when a member having relatively low capabilities exits the group.

18 Claims, 3 Drawing Sheets

PROTOCOL NEGOTIATION FOR A GROUP COMMUNICATION SYSTEM

BACKGROUND OF THE INVENTION

1. Field of the Invention

This invention relates to computer network protocols. More particularly, this invention relates to dynamic negotiation of the protocol version for a view-oriented group communication system.

2. Description of the Related Art

In any software system being continuously maintained and deployed, multiple versions may co-exist in parallel. If the system is a distributed one in which various components communicate with each other, this may cause problems if the communicating components run different versions. For example, the communication protocol might have been modified between the versions. If the different components are to coordinate an action (e.g., distributed garbage collection, cooperative caching) so that each component deterministically takes the same decision, the decision criteria might diverge in different versions. The states that the implementations of different versions maintain may be incompatible or not easily convertible to each other.

There is a commonly used solution to the above problems in the prior art for a client-server model. Either the server (more commonly) or the client (less commonly) is designed to support multiple versions. When the client connects to the server, they start a negotiation phase during which they agree on the version to use during the session. Once negotiated, this version never changes dynamically afterwards. This solution is used by NFS-based and HTTP-based communication.

Group communication is a technique for providing multipoint to multi-point communication by organizing communication entities in groups. For example, a group can consist of users playing an on-line game with each other. Another group can consist of participants in a multi-media conference. Each group is associated with a logical name. Communication entities communicate with group members by sending a message targeted to the group name; the group communication service delivers the message to the group members.

The Ensemble group communication system, developed at Cornell University and the Hebrew University of Jerusalem and available from the website of the Distributed Systems Laboratory of Technion—Israel Institute of Technology, provides a library of protocols for building complex distributed applications. Using Ensemble, an application registers event handlers with Ensemble, and then the Ensemble protocols handle the details of reliably sending and receiving messages, transferring state, implementing security, detecting failures, and managing reconfigurations in the system. The high-level protocols provided to applications are really stacks of tiny protocol "layers. These protocol layers each implement several simple properties: they are composed to provide sets of high level properties, such as total ordering, security, virtual synchrony.

SUMMARY OF THE INVENTION

An embodiment of the invention provides a computer-implemented method for changing a communications protocol in a group communication system having a plurality of communication entities, which is carried out by defining a first view specifying a first set of the communication entities and a first version of a protocol used for communication in the group communication system. The method is further carried out by detecting a requirement to change to a second version of the protocol, and responsively thereto, instantiating a second view, wherein the second view specifies a second set of the communication entities and the second version of the protocol.

In one aspect of the method, instantiating a second view includes disconnecting one of the communication entities from the first set of communication entities, forming a new view consisting only of the one communication entity, configuring the one communication entity in the new view with the second version of the protocol, and thereafter reconnecting the one communication entity with the second set of communication entities.

In another aspect of the method, disconnecting and reconnecting the one communication entity are performed only upon determining that the first version and the second version are concurrently inoperative by the communication entities.

Another aspect of the method includes receiving first messages in the communication entities that are transmitted according to the first version while receiving second messages therein that are transmitted according to the second version and concurrently receiving and transmitting application message traffic in the communication entities.

Other embodiments of the invention provide computer software product and apparatus for carrying out the above-described method.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
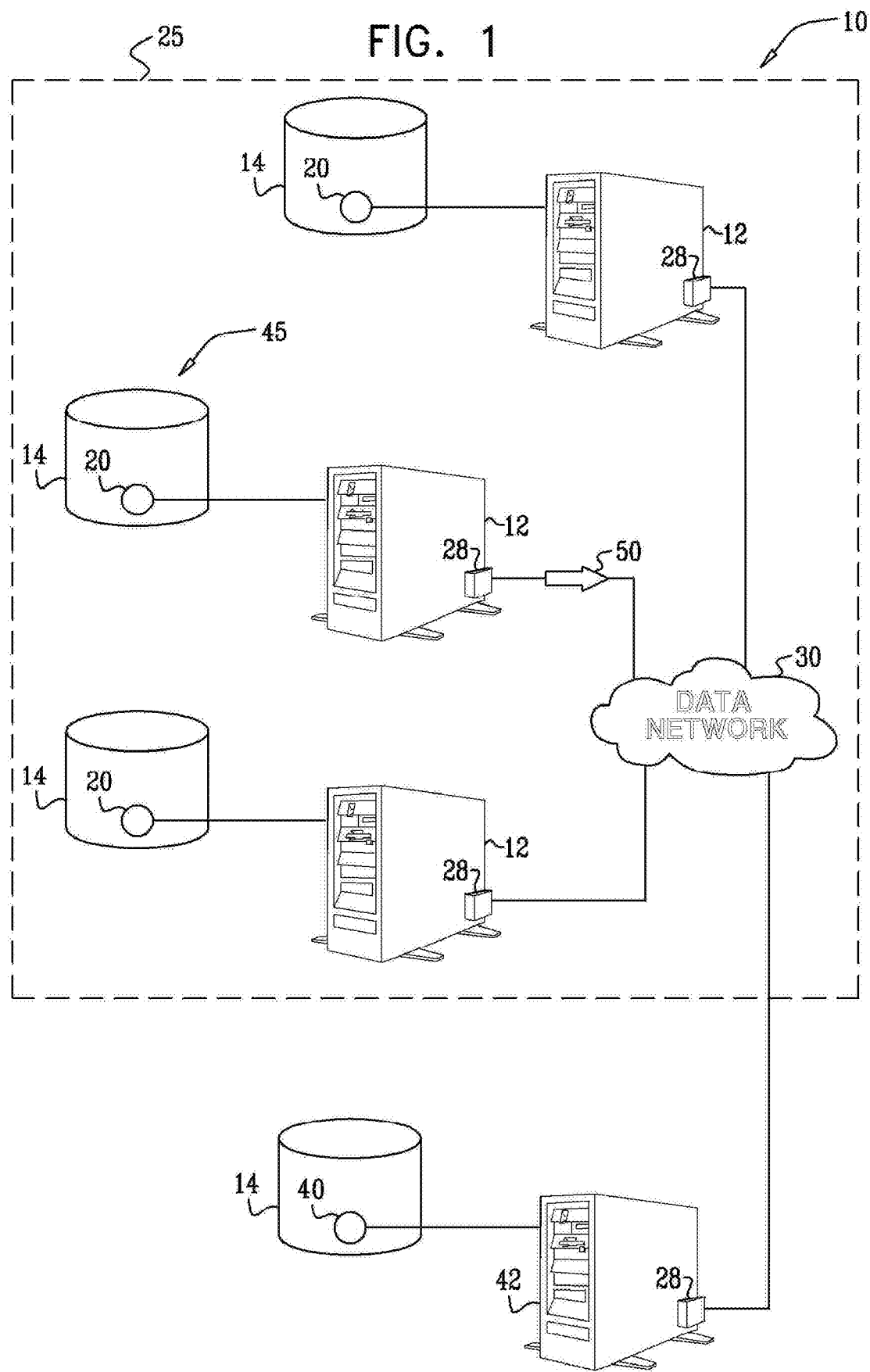
FIG. 1 is a pictorial diagram of a view-oriented group communication system in which the invention may be implemented.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a tangible readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

System Overview

A group communication service that provides multi-point to multi-point communication can consist of any number of members, and its membership may vary dynamically. In operation, group members coordinate according to an agreed upon scheme or protocol, which may exist in multiple versions. As used herein, the terms "protocol" and "protocol version" refers to a specification of arrangements used for communication and coordination among the group members. These arrangements may include, for example, messaging conventions and formats, actions to be taken by the members responsively to group messages, selection and configuration of hardware and software relating to intra-group communications, and even lower level network communication issues that are capable of being selected or modified by the group members.

A joining member of a group may be configured with a protocol version that differs from the protocol version currently being used by the group, immediately raising the issue of the group simultaneously supporting multiple versions of the group communication protocol. Dealing with disparate protocol versions is more complicated in group-based communication than in a client-server model because the effective protocol version has to be agreed upon by all members of the group. Accomplishing this can involve complex negotiation and state synchronization among the members, and requires knowledge of the current group membership. In order to accommodate new members, aspects of the invention enable the group to switch to a different protocol version dynamically.

For example, if all group members are supporting protocol versions 1 to 5, they should probably choose the latest version 5. However, if a new member supporting only versions 1 to 3 joins afterwards, then every group member will need to switch to version 3. In a group communications service, membership change is typically accomplished asynchronously. Thus, there may be periods of time when a group member must conduct communication using both the old and the new protocol versions concurrently.

Alternatively, when a relatively less capable member exits the group, it may be desirable for the more capable remaining group members to reconfigure themselves with a newer protocol version.

An embodiment of the present invention provides a solution to the problem of supporting multiple versions of the protocol for a particular category of group-based communication systems called "view-oriented group communication systems". A view-oriented group communication system is based on a group membership service. One task of the group membership service is to maintain a record of the current group members. The membership service thereby provides each group member with a "view" of the group, which can be implemented as a list of the currently active and connected communication entities, as well as an identifier for the view. For convenience, the term "view" is sometimes also used herein to refer to the constituents of a group. The communication entities may be processes executing on servers or on other computing devices, and encompass embodiments in which the communication entities are distributed among different computing devices, or realized as multiple processes concurrently executing on one computing device in many combinations.

In a view, the communication entities can be remote from one another. Additionally or alternatively, the communication entities may be locally networked. Indeed, one computer may even host a plurality of group members. A detailed analysis of properties of different view-oriented group communication systems can be found in "Group Communication Specifications: A Comprehensive Study", Chockler et al., ACM Computing Surveys 33:4 (December, 2001), which is herein incorporated by reference. This paper focuses on view-oriented group communication systems, which provide membership and reliable multicast services to the members or processes in a group.

Group communications systems are typically administered using specialized messages that are communicated among its constituent communication entities. These messages are referred to herein as "protocol messages", and are described in further detail below. According to aspects of the invention, membership change procedures in view-oriented group communication systems are enhanced by adding fields for identification of supported protocol versions to certain protocol messages, when those messages are sent during membership change. As these messages are typically multicast within the group, group members become mutually aware of protocol versions that are currently supported within the group. Consequently, some traffic in dealing with protocol version negotiation during membership change operations can be eliminated. In some embodiments, fields for additional meta-information that facilitates message parsing are also added to some messages. For example, flags may be added to indicate whether a message is compressed or encrypted. Protocol messages are to be distinguished from traffic received from sources and delivered to destinations in the multi-point to multi-point communication operation of the group communications service. Such traffic is referred to as "application messages" or "application message traffic".

When a new view is formed, group members agree on the protocol version. Typically, the protocol version selected is the maximal version that is supported by every member in the view. The life span of the newly selected protocol version coincides with the duration of the view.

Messages of different protocol versions may have different formats. Therefore, every view member must be able to parse and interpret messages at all communication layers in all formats that correspond to the protocol versions the member supports.

There are two methods of changing the protocol version. If the difference in the protocol is minor, the member will be able to support both old version and new version communication concurrently for the duration of the protocol change.

However, if the difference in the protocol is major, a member of a group using the old version and a member of the group using the new version are concurrently inoperative within the same view. As support of old and new protocol versions simultaneously is not feasible in this case, an alternative method of changing the protocol version is used. The member temporarily disconnects from the rest of the group. It does this by creating a new view consisting only of itself. It then switches to the new protocol version, and finally rejoins the group. In some embodiments of the present invention, only the latter method is used.

A significant benefit of the invention is that it provides a warm reconfiguration without requiring that the system be shut down. It is also fault-tolerant due to the way that it is integrated with the membership change procedures of the group communications service.

System Architecture

Turning now to the drawings, reference is initially made to FIG. 1, which is a pictorial diagram of a view-oriented group communication system 10 in which the present invention may be implemented. View-oriented group communication system 10 comprises a set of general purpose computers 12. Each computer 12 is provided with a memory 14 for storage of executables and data. Memory 14 is typically realized as a hard disk. Alternatively, computers 12 may use other known types of integral or distributed memory alone or in combination with the hard disk as memory 14. In particular, memory 14 stores applications that may execute during the operation of system 10, including one or more communication entities 20 which are members of a group 25. In the example shown in FIG. 1, group 25 comprises three communication entities 20, each of which resides on a separate computer 12. The group communication system 10 may be organized in functional layers known as a distribution and consistency Service (DCS), which is described below.

Each computer 12 is provided with a communication interface 28, such as a network card, which may use any known networking technique, including wireless links, optical networks, etc. Communication interfaces 28 are interconnected using an underlying network 30, such as the internet. A communication entity 40 resides on a computer 42, which is networked with computers 12. However, communication entity 40 is not currently a member of group 25.

Communication between communication entities 20 executed by computers 12 typically uses a reliable multicast transport protocol, for example PGM (Pragmatic General Multicast), enhanced in accordance with the present invention as described hereinbelow. PGM is described in Network Working Group RFC 3208.

After group 25 forms, communication entities 20 elect a view leader 45. View leader 45 is responsible for synchronization of processing among communication entities 20.

In an exemplary scenario, communication entity 40, running on computer 42, wishes to join group 25. However, communication entity 40 supports only older versions of the protocol than that currently being used by the members of group 25. For example, suppose that all existing members of group 25 support protocol versions 1 to 5, and therefore that the current view is running protocol version 5. Suppose further that communication entity 40 supports only protocol versions 1 to 3.

Figure 2:
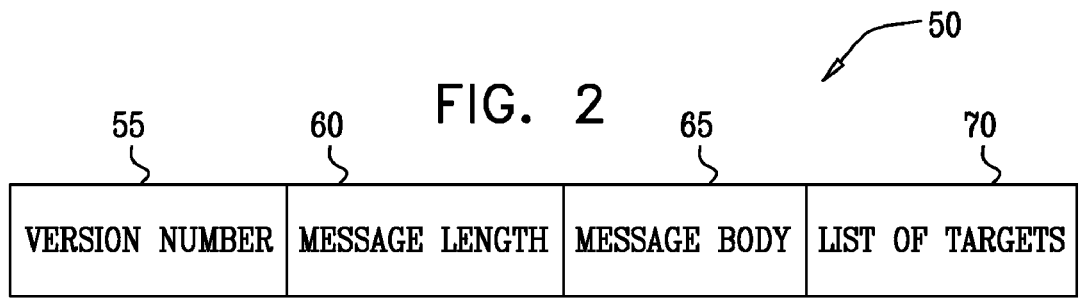
FIG. 2 is an example of a protocol message used in a group communication system, in accordance with a disclosed embodiment of the invention.

Reference is now made to FIG. 2, which is an example of a protocol message 50 used in a group communication system, in accordance with a disclosed embodiment of the invention. Protocol message 50 comprises:

a field 55 which contains the protocol version number;

a field 60 which contains the length of protocol message 50;

a field 65 which comprises the body of the message; and a field 70 which contains a list of targets, i.e., a list of members intended to receive the message. Field 70 is used as a filter for received messages. In one version of the protocol, field 70 may be an array of indices into a well known set of names/strings. While in another version, field 70 may be an array of indices into a set of targets.

Operation

Figure 3:
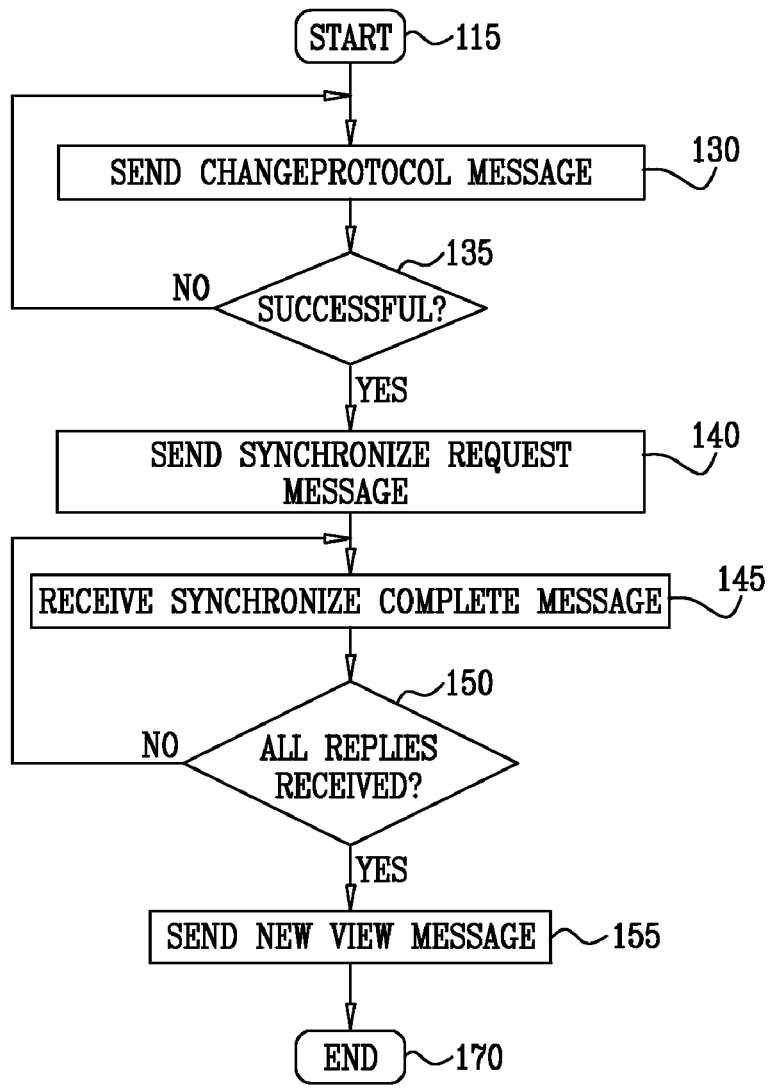
FIG. 3 is a flow chart describing a method of initiating a change in the protocol version for a view-oriented group communication system, in accordance with a disclosed embodiment of the invention.

Reference is now made to FIG. 3, which is a flow chart describing a method of initiating a change in the protocol version for a view-oriented group communication system, in accordance with a disclosed embodiment of the invention. For convenience of presentation, the following methods are disclosed by reference to FIG. 1, it being understood that the methods are applicable to many different group communication system arrangements and topologies. During performance of these methods, the system continues processing multi-point to multi-point application message traffic transparently to external sources and destinations.

In initial step 115, communication entity 40 (FIG. 1) attempts to join the group. View leader 45 determines that the highest version supported by communication entity 40 (protocol version 3) is incompatible with current protocol version 5. View leader 45 determines that the protocol version of group 25 must be changed to protocol version 3. It should be noted that if the protocol version of communication entity 40 were the same or higher than current protocol version 5, the group's protocol version need not be changed and the membership change could be performed conventionally. At most, communication entity 40 would be required to reduce its protocol version to protocol version 5 as a condition of joining the group if the higher version were not backward-compatible. Many other situations may cause view leader 45 to direct a protocol version change. For example, as noted above, loss of a group member may permit the group to operate with a higher protocol version. In another example, deployment of a newly released protocol version may result in a performance of initial step 115.

Next, at step 130, view leader 45 (FIG. 1) sends a multicast "Change Protocol" protocol message to the other members of group 25, informing the group members that the protocol version must be changed to protocol version 3. This message and the other protocol messages described below are sent with a quality of service parameter set to at least virtual synchrony. Virtual synchrony is defined in the above cited paper "Group Communication Specifications: A Comprehensive Study", and requires two communication entities that participate in the same two consecutive views to deliver the same set of messages in the former. When communication entities 20 receive this message, they verify that the next protocol version 3 is supported.

Alternatively, the quality of service parameter can be set to real synchrony, which guarantees message reception by the other members. When real synchrony is in force, the sender is blocked until all the receivers have acknowledged receipt of the message. Alternatively, the sender may be blocked until a predetermined number of acknowledgement signals (ACKs) or reply protocol messages have been received. The use of real synchrony provides the highest guarantee that a message has been delivered to all receivers.

Next, at decision step 135, it is determined whether the message sent at step 130 was sent successfully. If the determination at decision step 135 is negative, control returns to step 130 to try again. As the quality of service normally guarantees delivery to all communication entities 20 (FIG. 1) in the view, a negative determination at decision step 135 may indicate a hardware or network failure, causing a view change and subsequent retry.

If the determination at decision step 135 is affirmative, control proceeds to step 140. Referring again to FIG. 1, view leader 35 sends a "Request Synchronization" protocol message to all communication entities 20 in its view. This message is used to ensure that the relevant applications of all group members are in a consistent state immediately prior to a view change. In some embodiments, the "Request Synchronization" protocol message is one of the protocol messages that contains a field that identifies the protocol version that is to be adopted by the group.

When each member of group 25 receives the "Request Synchronization" protocol message, it uses information contained in the message to put itself into a consistent state with the other members of group 25. The members reconfigure themselves to operate with the protocol version that was specified in the "Request Synchronization" message of step 140. Each of the communication entities 20 then sends a "Synchronize Complete" protocol message to view leader 45. This protocol message also includes a field that contains a confirmatory identifier of the new protocol version.

Referring again to FIG. 3, control passes to step 145, where view leader 45 (FIG. 1) receives one of the "Synchronize Complete" protocol messages.

Next, at decision step 150, it is determined whether "Synchronize Complete" protocol messages have been received from all the communication entities 20. If the determination at step 150 is negative, control returns to step 145. Failure to receive the "Synchronize Complete" protocol messages is treated as in the discussion of failure to receive messages in decision step 135.

If the determination at decision step 150 is affirmative, control proceeds to step 155. View leader 45 sends a "New View" protocol message to all communication entities 20. This is similar to a conventional "New View" protocol message, but is enhanced to include fields containing an identifier of the new protocol version. This is necessary, despite the previous notification of the new version number at step 130, because not all members may support the proposed new version, in which case the version change may be aborted.

Control next proceeds to final step 170, and the procedure terminates.

Figure 4:
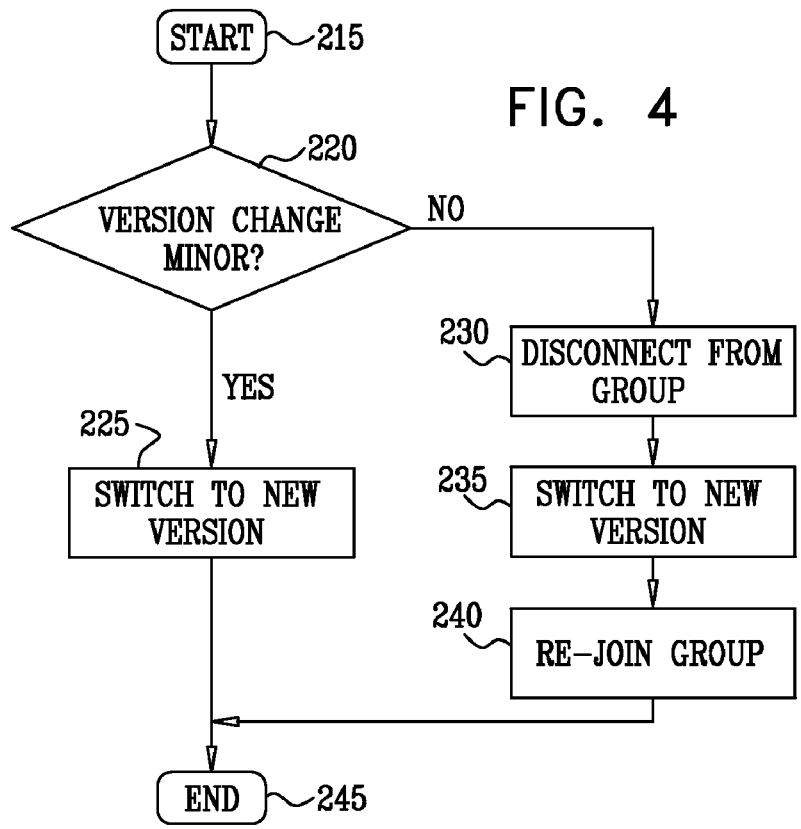
FIG. 4 is a flow chart describing a method of changing the protocol version of a member of a group within a view-oriented group communication system, in accordance with a disclosed embodiment of the invention.

Reference is now made to FIG. 4, which is a flow chart describing details of a method of changing the protocol version of a member of group 25 (FIG. 1), within view-oriented group communication system 10 (FIG. 1), in accordance with a disclosed embodiment of the invention. This method is normally performed by each group member following reception of a "New View" protocol message at step 155.

The procedure starts in initial step 215. Referring again to FIG. 1, one of communication entities 20 has received a "Request Synchronization" protocol message from view leader 35, that communicates a different protocol version (version 3, in this example) from the version 5 currently being run.

Control proceeds to decision step 220. It is determined whether the change in version is a minor change, i.e., whether it will be possible for two communication entities 20 to function together in a single view if one communication entity 20 runs old version 5 and the other runs new version 3. Typically, this determination is made using a version compatibility table. In some embodiments, this determination is made by the individual group members. In other embodiments, the determination is made by the view leader, and passed as an additional field in the "New View" protocol message. In yet other embodiments, the determination is based on tables maintained by each individual group member. Each group member sends a range of values that it supports. The view leader then determines the greatest common denominator and sends that value out.

If the determination at decision step 220 is affirmative, control proceeds to step 225. Referring again to FIG. 1, each communication entity 20 changes to new protocol version 3, while installing the new view. At this point it starts to send messages using the new protocol version, but continues to handle the incoming messages that were sent using old protocol in the previous view.

Incoming messages that were sent using the new protocol are put on queue at this stage. They are delivered to upper layers of the group communications service or to the higher application only when there is an indication that there are no more old protocol messages. A layered group communication service (DCS) is known, for example, from the document Farchi et al., "Effective Testing and Debugging Techniques for a Group Communication System," *Proceedings of the 2005 International Conference on Dependable Systems and Networks* (DSN '05)), which is herein incorporated by reference. A view-oriented component is described that runs beneath a higher level application. It comprises a stack of multiple layers, including a virtual synchrony layer, an application interface layer, and a membership layer.

From the foregoing, it will be seen that during step 225, each communication entity must be prepared to accept old version protocol messages from other communication entities 20 that have not yet converted to use the new protocol version, until all communication entities 20 within the new view stabilize using new protocol version 3. Control proceeds to final step 245.

If the determination at decision step 220 is negative, control proceeds to step 230. Each communication entity 20 (FIG. 1) disconnects from the view to form its own view, consisting only of itself. Disconnection of a member from the group in this manner is well-known in the art, and is therefore not discussed in further detail.

Next, at step 235, each communication entity 20 (FIG. 1) switches to new protocol version 3.

Next at step 240, using the group's standard membership addition procedure, communication entities 20 each rejoin the group 25, which is now operating under protocol version 3. A new view is formed, which now includes communication entity 40, possibly with a new view leader.

Next, at final step 245, the procedure exits.

ALTERNATIVE EMBODIMENT

Figure 5:
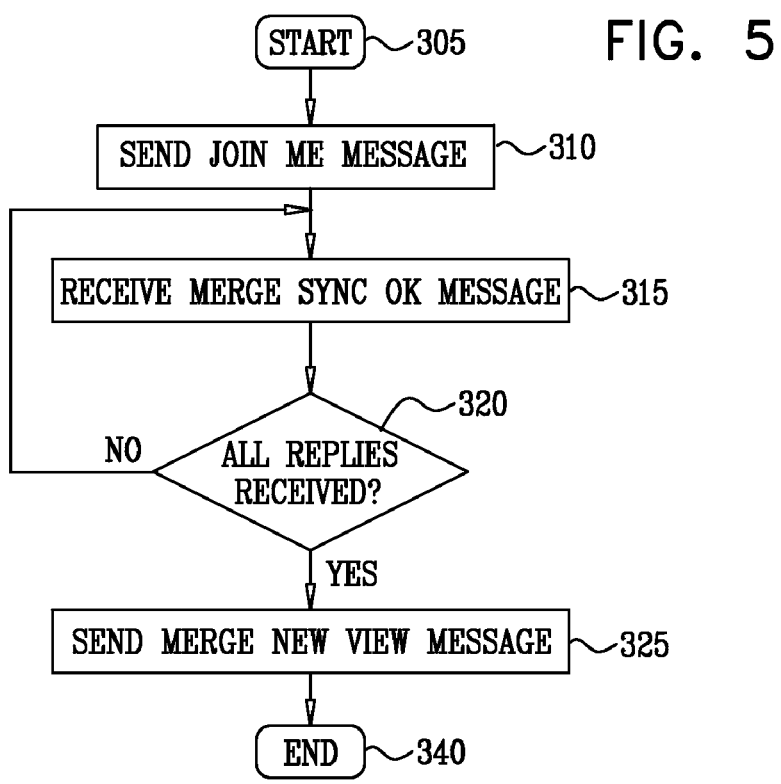
FIG. 5 is a flow chart describing a method of initiating a change in the protocol version for a view-oriented group communication system, in accordance with an alternative embodiment of the invention.

Reference is now made to FIG. 5, which is a flow chart describing an alternative method of initiating a change in the protocol version for a view-oriented group communication system, in accordance with a disclosed embodiment of the invention.

At an initial step 305, it is decided to merge two or more views into a single view. For example, in FIG. 1, it is decided to merge the view consisting of the members of group 25 with the singleton view consisting of communication entity 40. Communication entity 40 is the view leader of its view. View leaders 40 and 45 elect a merge leader, which will be responsible for coordinating the merge.

At step 310, the merge leader sends a "Join Me" protocol message to the view leaders of the views being merged. The protocol message contains details of the protocol versions supported by members of the merge leader's view.

The view leaders each respond with a "Merge Sync OK" protocol message. These protocol messages contain details of the protocol versions supported by the members of the respective views.

At step 315, the merge leader receives one of the "Merge Sync OK" protocol messages.

Next, at decision step 320, it is determined whether "Merge Sync OK" protocol messages have been received from all the view leaders being joined. If the determination at step 320 is negative, control returns to step 315. Failure to receive the "Merge Sync OK" protocol messages is treated as in the discussion of failure to receive messages in decision step 135 (FIG. 3).

At step 325, the merge leader sends a "Merge New View" protocol message. This message contains details of the new protocol version to be used in the merged view.

Control proceeds to a final step 340. The view leaders now send "New View" protocol messages as in step 155 (FIG. 3), which will cause each communication entity to change its protocol version as in FIG. 4.

EXAMPLE

The invention has been applied using IBM® WebSphere® Application Server, V6.1 in a test configuration having a group of five members, in which large numbers of protocol messages were exchanged each second. Protocol versions were successfully changed back and forth without interference to the ongoing dissemination of large numbers of application messages to their destinations, which does not requires the virtual synchrony quality of service (QoS). The duration of application message interference was less than a second.

It will be appreciated by persons skilled in the art that the present invention is not limited to what has been particularly shown and described hereinabove. Rather, the scope of the present invention includes both combinations and sub-combinations of the various features hereinabove, as well as variations and modifications thereof that are not in the prior art, which would occur to persons skilled in the art upon reading the foregoing description.

The invention claimed is:

1. A computer-implemented method for protocol negotiation in a group communication system, comprising the steps of: defining a first view comprising at least three communications entities and specifying a use of a first version of a communications protocol;
    electing by the first view one of said at least three communications entities as a view leader;
    conducting multi-point to multi-point communication among said at least three communications entities using said first version;
    detecting a requirement to change to a second version of said communications protocol; and
    coordinating the change under control of said view leader by exchanging among said at least three communications entities protocol messages, and responsively to said protocol messages causing each of said at least three communications entities to perform the steps of:
    disconnecting from said first view to define one of disconnected communications entities;
    forming respective second views consisting only of one of said disconnected communications entities;
    in said second views configuring said second views with said second version; and
    thereafter instantiating a third view comprising all of disconnected communications entities, and specifying a use of said second version.

2. The method according to claim 1, further comprising the steps of:
    in said second views processing first incoming messages that were sent according to said first version; and
    queuing second incoming messages that were sent according to said second version while processing said first incoming messages.

3. The method according to claim 1, wherein at least one of said protocol messages comprises an identifier of said second version.

4. The method according to claim 1, wherein said first version and said second version comprise a multicast protocol.

5. The method according to claim 1, wherein a quality of service parameter of said protocol messages has a value of virtual synchrony, wherein said at least three communications entities are required to exchange an identical set of said protocol messages.

6. The method according to claim 1, wherein a quality of service parameter of said protocol messages has a value of real synchrony, wherein said view leader is blocked until all receivers of a protocol message have acknowledged receipt thereof.

7. A computer software product protocol negotiation in a group communication system, including a computer storage medium in which computer program instructions are stored, which instructions, when executed by a computer, cause the computer to perform the steps of:
    electing by the first view one of said at least three communications entities as a view leader;
    conducting multi-point to multi-point communication among said at least three communications entities using said first version;
    detecting a requirement to change to a second version of said communications protocol; and
    coordinating the change under control of said view leader by exchanging among said at least three communications entities protocol messages, and responsively to said protocol messages causing each of said at least three communications entities to perform the steps of:
    disconnecting from said first view to define one of disconnected communications entities;
    forming respective second views consisting only of one of said disconnected communications entities;
    in said second views configuring said second views with said second version; and
    thereafter instantiating a third view comprising all of disconnected communications entities, and specifying a use of said second version.

8. The computer software product according to claim 7, wherein the instructions further cause each of said at least three communications entities in said second views to perform the steps of processing first incoming messages that were sent according to said first version; and
    queuing second incoming messages that were sent according to said second version while processing said first incoming messages.

9. The computer software product according to claim 7, wherein at least one of said protocol messages comprises an identifier of said second version.

10. The computer software product according to claim 7, wherein said first version and said second version comprise a multicast protocol.

11. The computer software product according to claim 7, wherein a quality of service parameter of said protocol messages has a value of virtual synchrony, wherein said at least three communications entities are required to exchange an identical set of said protocol messages.

12. The computer software product according to claim 7, wherein a quality of service parameter of said protocol messages has a value of real synchrony, wherein said view leader is blocked until all receivers of a protocol message have acknowledged receipt thereof.

13. A data processing system adapted to protocol negotiation in a group communication system, comprising:
    a communications entity having a processor; a communications interface linked to said communications entity, wherein said processor is operative to exchange messages via said communications interface with other communications entities, including performing the steps of:

in a first view comprising at least three communications entities and specifying a use of a first version of a communications protocol;

accepting an election by said at least three communications entities as a view leader;

conducting multi-point to multi-point communication among said at least three communications entities using said first version;

detecting a requirement to change to a second version of said communications protocol; and coordinating the change under control of said view leader by exchanging among said at least three communications entities protocol messages, and responsively to said protocol messages causing each of said at least three communications entities to perform the steps of:

disconnecting from said first view to define one of disconnected communications entities;

forming respective second views consisting only of one of said disconnected communications entities;

in said second views configuring said second views with said second version; and thereafter instantiating a third view comprising all of disconnected communications entities, and specifying a use of said second version.

14. The data processing system according to claim 13, wherein said processor is operative to cause each of said at least three communications entities in said second views to perform the steps of processing first incoming messages that were sent according to said first version; and queuing second incoming messages that were sent according to said second version while processing said first incoming messages.

15. The data processing system according to claim 13, wherein at least one of said protocol messages comprises an identifier of said second version.

16. The data processing system according to claim 13, wherein said first version and said second version comprise a multicast protocol.

17. The data processing system according to claim 13, wherein a quality of service parameter of said protocol messages has a value of virtual synchrony, wherein said at least three communications entities are required to exchange an identical set of said protocol messages.

18. The data processing system according to claim 13, wherein a quality of service parameter of said protocol messages has a value of real synchrony, wherein said view leader is blocked until all receivers of a protocol message have acknowledged receipt thereof.

* * * * *